(12) United States Patent
Auvenshine et al.

(10) Patent No.: US 11,189,290 B2
(45) Date of Patent: Nov. 30, 2021

(54) INTERACTIVE SELECTION AND MODIFICATION

(71) Applicant: INTERNATIONAL BUSINESS MACHINES CORPORATION, Armonk, NY (US)

(72) Inventors: John J. Auvenshine, Tucson, AZ (US); Jason LaScola, Grand Rapids, MI (US); Michael Flores, Clarksburg, MD (US); Marci Devorah Formato, Clintondale, NY (US); Ramesh Babu Kothamasu, Downington, PA (US); Vidula M Patel, Elmhurst, IL (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 16/702,632

(22) Filed: Dec. 4, 2019

(65) Prior Publication Data

US 2021/0174808 A1 Jun. 10, 2021

(51) Int. Cl.
*G10L 15/26* (2006.01)
*G10L 15/08* (2006.01)
*G10L 15/06* (2013.01)

(52) U.S. Cl.
CPC ............ *G10L 15/26* (2013.01); *G10L 15/063* (2013.01); *G10L 15/08* (2013.01)

(58) Field of Classification Search
None
See application file for complete search history.

(56) References Cited

U.S. PATENT DOCUMENTS

| | | | |
|---|---|---|---|
| 9,305,319 B2 | 4/2016 | Maor | |
| 9,536,444 B2 | 1/2017 | Haverlock et al. | |
| 10,249,207 B2 | 4/2019 | Solomon et al. | |
| 2006/0112054 A1* | 5/2006 | Jeanblanc | G09B 7/00 706/46 |

(Continued)

OTHER PUBLICATIONS

Mell, Peter et al.; "The NIST Definition of Cloud Computing;" National Institute of Standards and Technology; Special Publication 800-145; Sep. 2011; 7 pages.

(Continued)

*Primary Examiner* — Neeraj Sharma
(74) *Attorney, Agent, or Firm* — Schmeiser, Olsen & Watts; Michael A. Petrocelli (57) ABSTRACT

A method, system, and program product for selecting software is provided. The method includes retrieving audio data during a call with a subject matter expert (SME). The audio data is converted into a data training set and documents of the SME are converted into a document training set. Canonical documents generated by authors are analyzed and specified code is extracted from the text data training set and document training set. Attributes of individuals are detected. The attributes are compared with specified data and the canonical documents and it is determined that the individuals are requesting information associated with the text data. The information is provided to the individuals via the canonical documents or the documents of the SME and it is determined if a matched set of data exists between the attributes, the specified data, and the canonical documents. A digital action associated with results of the determination is executed.

20 Claims, 9 Drawing Sheets

(56) References Cited

U.S. PATENT DOCUMENTS

| | | | |
|---|---|---|---|
| 2009/0125796 A1* | 5/2009 | Day | G06F 9/451 715/219 |
| 2009/0187437 A1* | 7/2009 | Spradling | G06Q 40/06 705/35 |
| 2011/0125697 A1* | 5/2011 | Erhart | G06Q 30/0256 706/47 |
| 2011/0208822 A1* | 8/2011 | Rathod | G06F 16/9535 709/206 |
| 2013/0262129 A1* | 10/2013 | Choi | G10K 11/002 704/500 |
| 2014/0125678 A1* | 5/2014 | Wang | A63F 13/80 345/473 |
| 2014/0142938 A1* | 5/2014 | Takeuchi | G10L 15/22 704/235 |
| 2014/0156254 A1* | 6/2014 | Frankel | G10L 15/005 704/2 |
| 2014/0279925 A1* | 9/2014 | Grossman | G06F 16/33 707/662 |
| 2015/0088668 A1* | 3/2015 | Bruce | G06F 16/972 705/14.73 |
| 2016/0042134 A1* | 2/2016 | Takla | G06F 16/3322 705/3 |
| 2016/0044380 A1 | 2/2016 | Barrett | |
| 2017/0116384 A1* | 4/2017 | Ghani | G16H 10/60 |
| 2019/0130361 A1 | 5/2019 | Hazarika et al. | |
| 2019/0361428 A1* | 11/2019 | Ganapathi | G06Q 10/063116 |

OTHER PUBLICATIONS

Anonymous; Enrichment of Knowledge Base of Conversational Agents by Active Question Targeting; IP.com; IPCOM000250619D; Aug. 10, 2017; 5 pages.

Anonymous; Expertise Assessment Based on User-to-User Proximity Over Time; IP.com; IPCOM000237846D; Jul. 16, 2014; 3 pages.

Anonymous; Topic Knowledge Rating; IP.com; IPCOM000208295D; Jun. 29, 2011; 5 pages.

Carroll, John M. et al.; Interface Design Issues for Advice-Giving Expert Systems; Communications of the ACM, vol. 30, No. 1; Jan. 1987; pp. 14-31.

Green, Kesten C. et al.; The Ombudsman: Value of Expertise for Forecasting Decisions in Conflicts; University of Pennsylvania, Scholarly Commons http://repository.upenn.edu/marketing_papers/48; May 2007; 15 pages.

IT service desk solutions; IBM Services; https://www.IBM.com/services/digital-workplace/watson-support; retrieved from the Internet Sep. 9, 2019; 7 pages.

Wexelblat, Richard L. et al.; On Interface Requirements for Expert Systems; AI Magazine, vol. 10, No. 3; Sep. 15, 1989; pp. 66-78.

Xing, Jing et al.; White Paper: Practical Insights and Lessons Learned on Implementing Expert Elicitation; Office of Nuclear Regulatory Research, U.S. Nuclear Commission; Oct. 13, 2016; 82 pages.

* cited by examiner

INTERACTIVE SELECTION AND MODIFICATION

BACKGROUND

The present invention relates generally to a method for selecting and modifying interactive software and in particular to a method and associated system for improving software technology associated with converting audio data into text data and extracting associated computer code for providing information and executing an associated digital action.

SUMMARY

A first aspect of the invention provides an interactive software selection and modification method comprising: retrieving, by a processor of a hardware device via a sensor of the hardware device, audio data retrieved during a conference call with a subject matter expert (SME); converting, by the processor, the audio data into a text data training set; converting, by the processor, informal documents of the SME into a document training set; analyzing, by the processor, canonical documents generated by a plurality of alternative authors; extracting, by the processor from the text data training set and the document training set, specified data and associated code; retrieving, by the processor, additional text data converted from audio data of a plurality of individuals; detecting, by the processor via a plurality of sensors, attributes of the plurality of individuals with respect to the additional text data; comparing, by the processor, the attributes with specified data and the canonical documents; first determining, by the processor, that the plurality of individuals are requesting information associated with the text data; providing, by the processor based on results of the first determining, the information to the plurality of individuals via the canonical documents or the informal documents of the SME and transcripts of conference calls of the SME; determining, by the processor based on results of the comparing, if a matched set of data exists between the attributes and the specified data and the canonical documents; and executing, by the processor, a digital action associated with results of the determining.

A second aspect of the invention provides a computer program product, comprising a computer readable hardware storage device storing a computer readable program code, the computer readable program code comprising an algorithm that when executed by a processor of hardware device implements an interactive software selection and modification method, the method comprising: retrieving, by the processor via a sensor of the hardware device, audio data retrieved during a conference call with a subject matter expert (SME); converting, by the processor, the audio data into a text data training set; converting, by the processor, informal documents of the SME into a document training set; analyzing, by the processor, canonical documents generated by a plurality of alternative authors; extracting, by the processor from the text data training set and the document training set, specified data and associated code; retrieving, by the processor, additional text data converted from audio data of a plurality of individuals; detecting, by the processor via a plurality of sensors, attributes of the plurality of individuals with respect to the additional text data; comparing, by the processor, the attributes with specified data and the canonical documents; first determining, by the processor, that the plurality of individuals are requesting information associated with the text data; providing, by the processor based on results of the first determining, the information to the plurality of individuals via the canonical documents or the informal documents of the SME and transcripts of conference calls of the SME; determining, by the processor based on results of the comparing, if a matched set of data exists between the attributes and the specified data and the canonical documents; and executing, by the processor, a digital action associated with results of the determining.

A third aspect of the invention provides a hardware device comprising a processor coupled to a computer-readable memory unit, the memory unit comprising instructions that when executed by the processor implements an interactive software selection and modification method comprising: retrieving, by the processor via a sensor of the hardware device, audio data retrieved during a conference call with a subject matter expert (SME); converting, by the processor, the audio data into a text data training set; converting, by the processor, informal documents of the SME into a document training set; analyzing, by the processor, canonical documents generated by a plurality of alternative authors; extracting, by the processor from the text data training set and the document training set, specified data and associated code; retrieving, by the processor, additional text data converted from audio data of a plurality of individuals; detecting, by the processor via a plurality of sensors, attributes of the plurality of individuals with respect to the additional text data; comparing, by the processor, the attributes with specified data and the canonical documents; first determining, by the processor, that the plurality of individuals are requesting information associated with the text data; providing, by the processor based on results of the first determining, the information to the plurality of individuals via the canonical documents or the informal documents of the SME and transcripts of conference calls of the SME; determining, by the processor based on results of the comparing, if a matched set of data exists between the attributes and the specified data and the canonical documents; and executing, by the processor, a digital action associated with results of the determining.

The present invention advantageously provides a simple method and associated system capable of accurately selecting and modifying interactive software.

DETAILED DESCRIPTION

Figure 1:
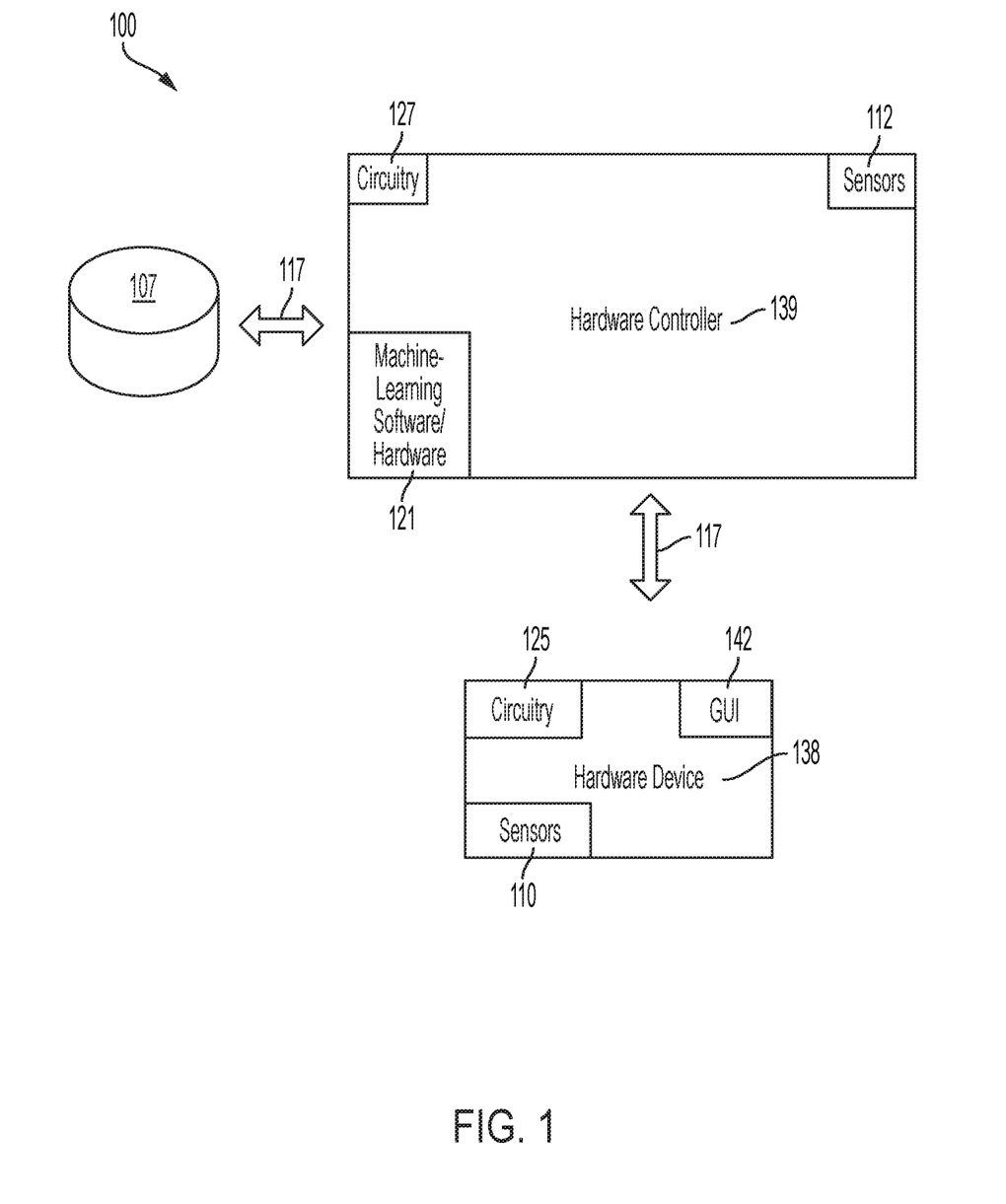
FIG. 1 illustrates a system for improving software technology associated with converting audio data into text data and extracting associated computer code for providing information and executing an associated digital action, in accordance with embodiments of the present invention.

FIG. 1 illustrates a system 100 for improving and software technology associated with converting audio data into text data and extracting associated computer code for providing information and executing an associated digital action, in accordance with embodiments of the present invention. The term "text" is defined herein as text based documents, charts, drawings, etc. A typical response-based system may be associated with differing time zones and scheduling conflicts which prevent users from attending multiple meetings requiring specified user skills. Likewise, a real time collaboration process may not efficiently function when an apparatus comprising key information is unavailable when needed. Additionally, a typical system may be designed for facilitating social interactions and social network building rather than providing information with respect to an individual's absence. Therefore, system 100 is enabled to generate an automated digital based stand in for a subject matter expert (SME) teleconference call when the SME is unable to be present due to time zone differences or meeting conflicts. System 100 is enabled to execute machine learning code for analyzing past interactions and/or teleconference call recordings (of an SME) for generating a personal corpus. The machine learning code is configured to generate a transcript corpus that is digitally tagged to a specific SME. Likewise, an extensive document corpus of things such as best practices and published documents is generated with respect to an interface. The interface may be associated with textual, question-driven, interactive attributes, emails, blog posts, social media posts, etc.

A personal corpus associated with the SME is generated using existing or natural personal material such as, inter alia, chat transcripts, conference calls, etc. Additionally, intelligent knowledge expert (IKE) code may be executed for detecting trigger words or questions and sentence boundaries. IKE code is configured to provide real-time information to a user such that when they are required to look up information or obtain current relevant information, IKE code will generate the aforementioned data for them. During a user enabled process, an IKE component will detect phone conversations and record typed words of user. The detection and recording process is executed in response to obtaining user permission for detecting and recording information from the phone conversation.

An IKE component is configured to execute IKE code with respect to voice to text or chat transcripts to detect trigger words with a higher accuracy and detect questions and sentence boundaries. The IKE component is enabled for performing a machine learning process with respect to a transcript corpus tagged by a personal identifier resulting in an SME's knowledge being available in real time.

A conflict resolution algorithm is executed between SMEs and published sources with the following three output options:

1. Presenting an SME position instead of published documents thereby replicating SME information including potential faults/errors.
2. Presenting a published document position using SME statements as a supplement thereby limiting the scope of associated potential faults/errors.
3. Presenting a conflict and delivering an SME position and a position from published documents.

Alternatively, system 100 enables an option to present information from an SME available interactively in a language differing from a language of the SME. For example, information from an SME who only speaks English may be delivered to a conference being conducted in German. A language conversion process is enabled by running system input and output through a language translator on both the listen and answer sides.

System 100 of FIG. 1 includes a hardware controller 139 (i.e., specialized hardware device), a hardware device 138, and a database 107 (e.g., a cloud-based system) interconnected through a network 117. Hardware controller 139 includes specialized circuitry 127 (that may include specialized software), sensors 112, and machine-learning software code/hardware structure 121 (i.e., including machine-learning software code). Hardware device 138 may include, inter alia, a smart phone, a tablet computer, a computing device, etc. Hardware device 138 may be Bluetooth enabled to provide connectivity to each other and any type of system. Hardware device 138 includes specialized circuitry 125 (that may include specialized software), sensors 110, and a GUI 142. Sensors 110 and 112 may include any type of internal or external sensor (or biometric sensor) including, inter alia, ultrasonic three-dimensional sensor modules, an optical sensor, a video retrieval device, an audio retrieval device, humidity sensors, voltage sensors, a keyboard, a mouse, a touch screen, etc. Hardware controller 139 and hardware device 138 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, hardware controller 139 and hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology associated with converting audio data into text data and extracting associated computer code for providing information and executing an associated digital action. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables the following functionality for dynamically selecting and modifying SME based software as follows:

1. Collecting recordings of conference calls comprising speech audio from an SME.

2. Processing recordings by converting the speech audio into text and converting the text into a transcript training set (i.e., a personal transcript corpus).
3. Collecting documents authored by the SME including, email, personal blog posts, text chats, social media posts, etc.
4. Converting informal documents authored by the SME (e.g., emails, notes, etc.) into a document training set (i.e., a personal document corpus).
5. Processing canonical documents (i.e., official, published works by others including the SME) and retrieving information from technical sources (e.g., Blogs, white papers, etc.) published by alternative sources to compare and contrast.
6. Updating a natural language understanding processing model based on new training sets.
7. Extracting question and answer pairs, position statements, and reference links from the personal transcript corpus and the personal document corpus. The extracted information may include trigger words spoken or written by the SME, question detection from alternative individuals followed by a response from the SME.
8. Receiving a new text or speech to text processed conversation with the alternative individuals with respect to the SME's expertise.
9. Detecting requests (e.g., questions, requests for position, requests for reference material, etc.) from attendees of a new conversation. The requests may be preceded by a wake-word for the system.
10. Matching requests to answers from the SME's personal corpora and a corpora from public/canonical sources.
11. If an SME's answer matches a canonical source answer or no canonical source answer is available, an SME's answer is presented.
12. If an SME's answer conflicts with a canonical source answer, an alert is transmitted to the SME and an answer is presented with respect to one of the following three response modes:
A. Stating an SME's answer instead of published documents.
B. Stating a published document answer with respect to an SME's personal statements as a supplement thereby limiting the scope of SME potential faults/errors.
C. Stating a conflict and delivering the SME's answer and the answer within published documents.
13. Providing an attendee with an opportunity to rate (e.g., provide feedback) with respect to a utility of an answer.
14. Transmitting a report to the SME (when a meeting without the SME concludes) identifying answers given on the SME's behalf and detected conflicts between the answers and canonical/published answers.
15. Allowing an SME to annotate a personal corpora with revisions to answers.

Figure 2:
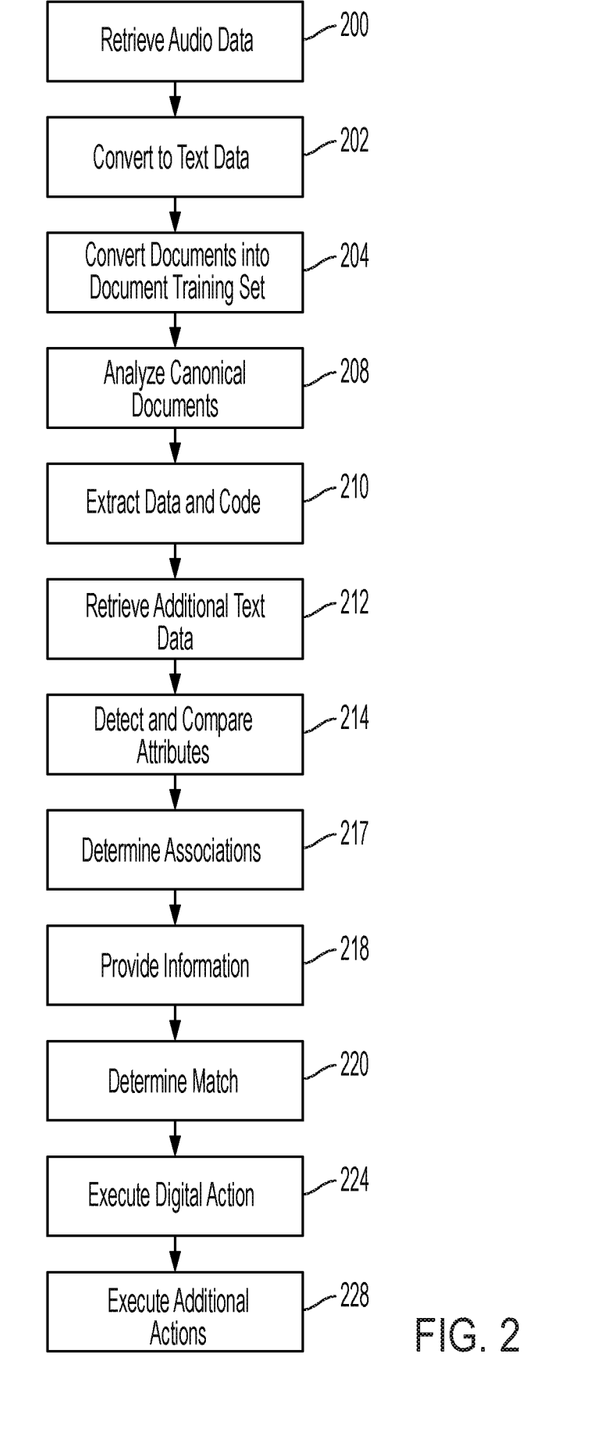
FIG. 2 illustrates an algorithm detailing a process flow enabled by the system of FIG. 1 for improving software technology associated with converting audio data into text data and extracting associated computer code for providing information and executing an associated digital action, in accordance with embodiments of the present invention.

FIG. 2 illustrates an algorithm detailing a process flow enabled by system 100 of FIG. 1 for improving and software technology associated with converting audio data into text data and extracting associated computer code for providing information and executing an associated digital action, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by hardware controller 139 and hardware device. In step 200, audio data retrieved during a conference call with a subject matter expert (SME) is retrieved via a sensor of the hardware device. In step 202, the audio data is converted into a text data training set. In step 204, informal documents of the SME are converted into a document training set. In step 208, canonical documents generated by a plurality of alternative authors are analyzed. In step 210, specified data and associated code are extracted from the text data training set and the document training set. In step 212, additional text data converted from audio data of a plurality of individuals is retrieved. In step 214, attributes of the plurality of individuals are detected (via sensors) with respect to the additional text data. The attributes are compared with specified data and the canonical documents. In step 217, it is determined that the plurality of individuals are requesting information associated with the text data. In step 218, the information is provided to the plurality of individuals via the canonical documents or the informal documents of the SME.

In step 220, it is determined if a matched set of data exists between the attributes and the specified data and canonical documents.

In step 224, a digital action associated with results of step 220 is executed. Results of step 220 may indicate that a matched set of data exists between the attributes and the specified data and canonical documents and executing the digital action may include: presenting specified data of their text data training set or the document training set. Alternatively, results of step 220 may indicate that a matched set of data does not exist between the attributes and the specified data and canonical documents and executing the digital action may include:
1. Presenting a dataset of the text data training set or the document training set.
2. Presenting a dataset of the canonical documents.
3. Indicating a conflict between the specified data and the canonical documents;
4. Presenting a dataset of the canonical documents and the specified data.

In step 228, additional actions are executed. The additional actions may include:
1. Receiving user feedback associated with the action.
2. Generating a digital report and associated computer code associated with executing the action.
3. Integrating the action with an interface with respect to virtual functionality.
4. Converting results of executing the action into a second language differing from a language of the specified data and the canonical documents.
5. Modifying software code (based on based on the specified data and the canonical documents) for executing future processes associated with an interactive software selection and modification method.

Figure 3:
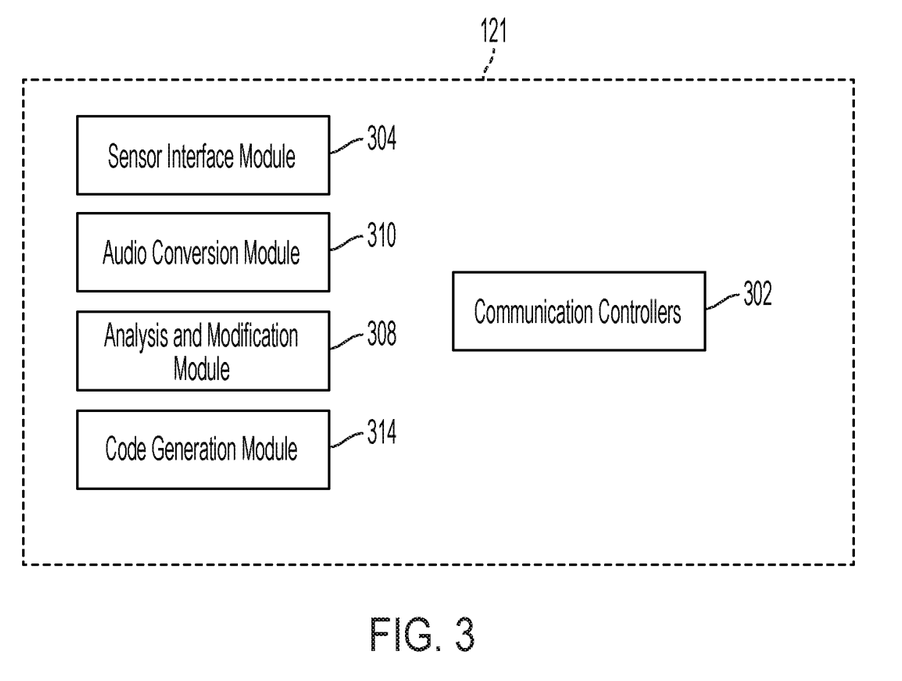
FIG. 3 illustrates an internal structural view of the self-learning software/hardware structure of FIG. 1, in accordance with embodiments of the present invention.

FIG. 3 illustrates an internal structural view of machine learning software/hardware structure 121 (and/or circuitry 127 or 125), in accordance with embodiments of the present invention. Machine learning software/hardware structure 121 includes a sensor interface module 304, an audio conversion module 310, an analysis and modification module 308, a code generation module 314, and communication controllers 302. Sensor interface module 304 comprises specialized hardware and software for controlling all functions related to sensors 110 or 112 of FIG. 1. Audio conversion module 310 comprises specialized hardware and software for controlling all functionality related to control of all audio to text conversion processes for implementing the process described with respect to the algorithm of FIG. 2. Analysis and modification module 308 comprises specialized hardware and software for controlling all functions related to the analysis and modification steps of FIG. 2. Code generation module 314 comprises specialized hardware and software for controlling all functions related to generating machine learning feedback for generating machine learning software code for executing future interactive software selection and modification processes. Communication controllers 302 are enabled for controlling all communications between sensor interface module 304, audio conversion module 310, analysis and modification module 308, and code generation module 314.

Figure 4:
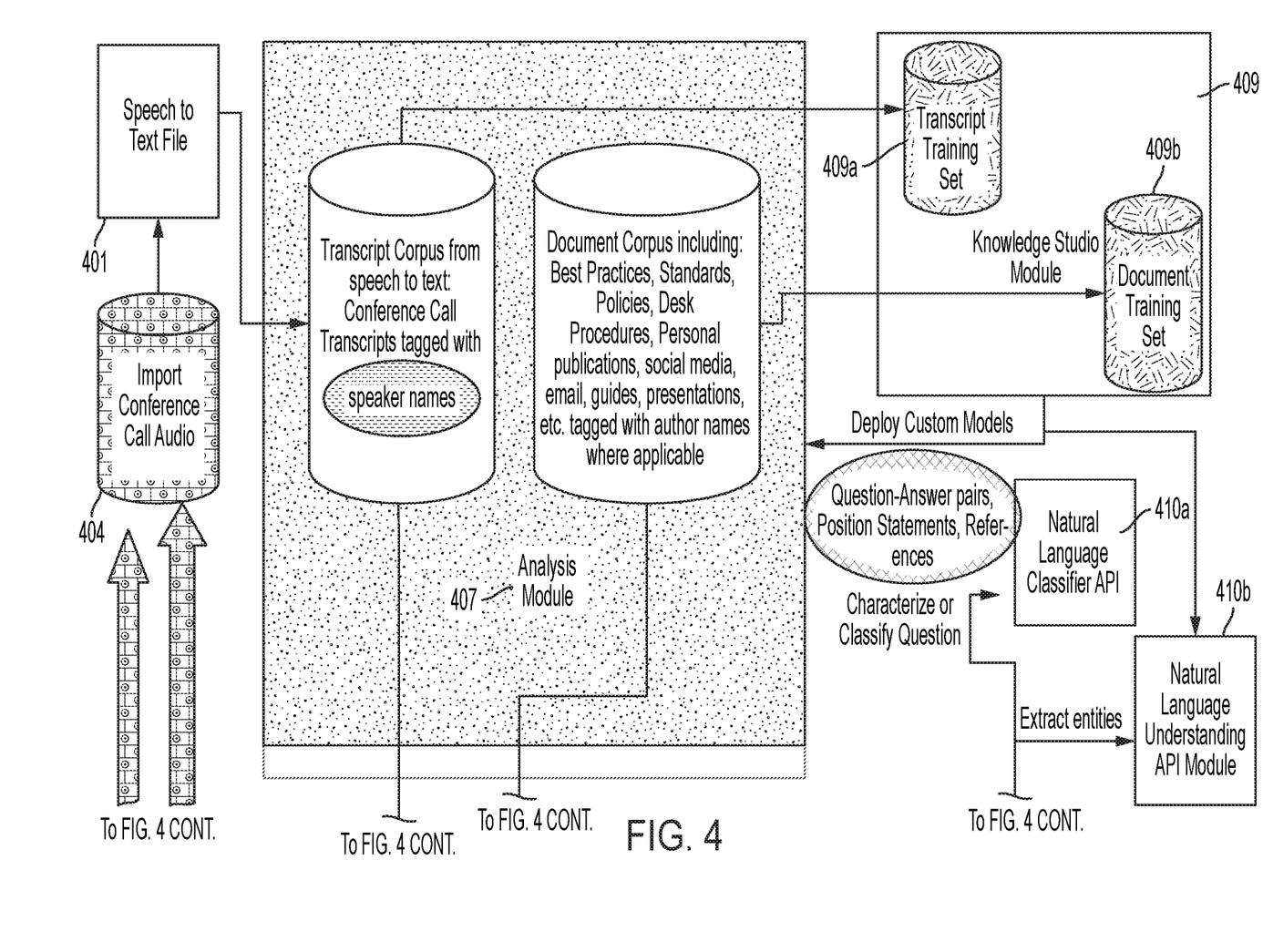
FIG. 4 illustrates a system associated with generating SME documentation and associated machine learning code, in accordance with embodiments of the present invention.

FIG. 4 illustrates a system 400 associated with generating SME documentation and associated machine learning code, in accordance with embodiments of the present invention. System 400 includes an analysis module 407, a knowledge studio module 409, a natural language API 410a and 410b, a software assistant module 414, and a results module 428. Analysis module 407 is configured to retrieve a speech to text conversion file 401. The speech to text conversion file 401 is generated from conference call audio retrieved from a database 404 and generated by an SME 434. An analysis module 407 retrieves the speech to text conversion file 401 and a transcript corpus and a document corpus are generated and tagged with speaker/author names. The transcript corpus is converted (via execution of a knowledge studio module 409) into a transcript training set 409a. The document corpus is converted (via execution of knowledge studio module 409) into a document training set 409b. The transcript training set 409a and the document training set 409b are transmitted to a natural language classifier application programming interface (API) 410a and a natural language understanding API 410b to generate question/answer pairs. Additionally, a software assistant module 414 is configured to generate conflict resolution with respect SME output and published source output. A module 424 is configured to provide updates and generate results and associated conflict resolutions 428. A software loop 416 for providing text to speech and speech to text from conference call audio and software applications (in differing languages) is executed for generating input to system 400.

Figure 5:
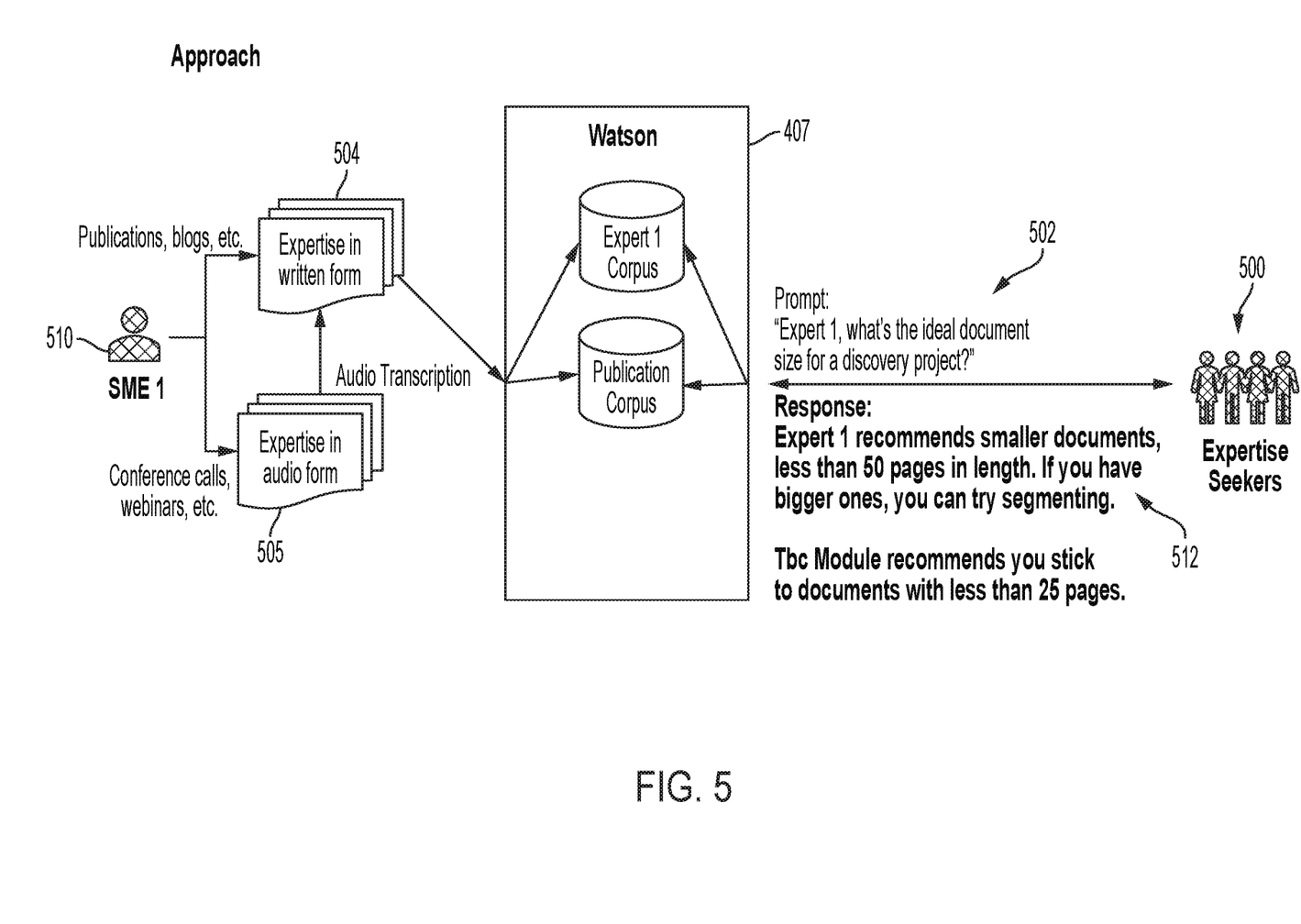
FIG. 5 illustrates an implementation process executed by the analysis module of FIG. 4, in accordance with embodiments of the present invention.

FIG. 5 illustrates an implementation process executed by analysis module 407 of FIG. 4, in accordance with embodiments of the present invention. The process is initiated when users 500 request an answer to the following question 502: What is the ideal size for a discovery project? In response, an SME 510 provides digital expertise 504 in written form and digital expertise 505 in audible form. SME 510 provides an initial response 512 (to question 502) indicating a document less than 50 pages. Subsequently, digital expertise 504 and 505 are analyzed by analysis module 407 and a response (to question 502) indicating a document less than 25 pages.

Figure 6:
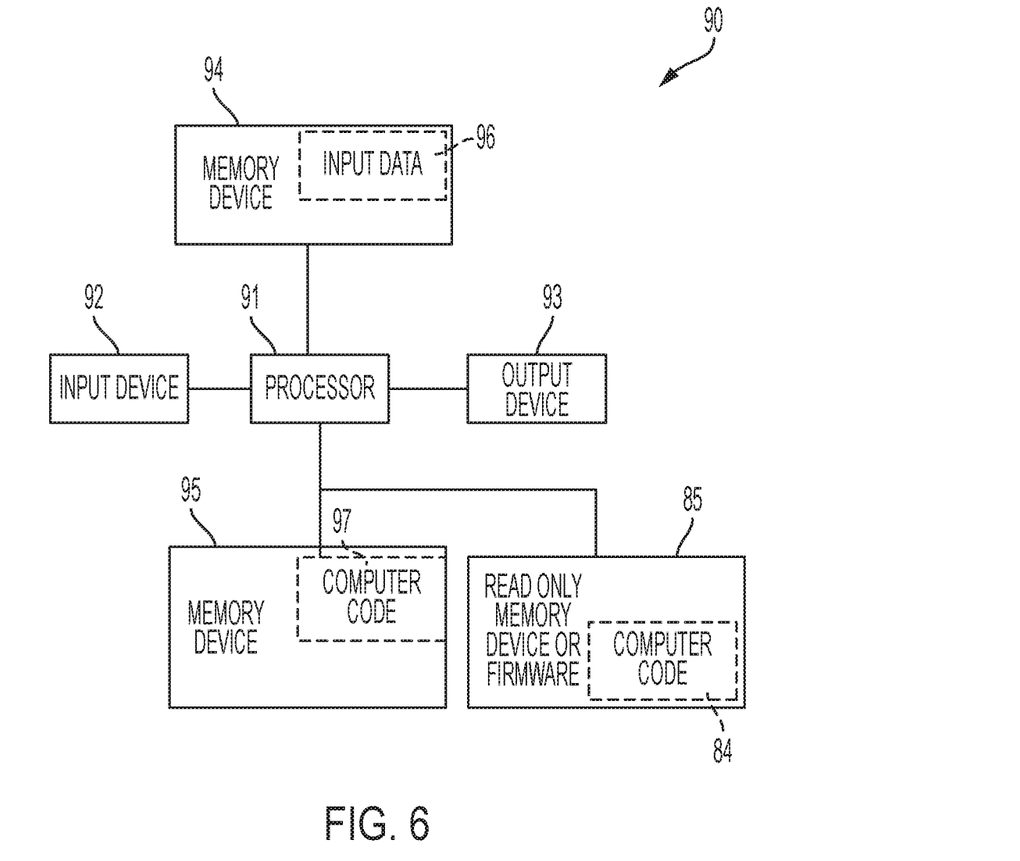
FIG. 6 illustrates a computer system used by the system of FIG. 1 for improving software technology associated with converting audio data into text data and extracting associated computer code for providing information and executing an associated digital action, in accordance with embodiments of the present invention.

FIG. 6 illustrates a computer system 90 (e.g., hardware controller 139 and/or hardware device 138 of FIG. 1) used by or comprised by the system of FIG. 1 for improving software technology associated with converting audio data into text data and extracting associated computer code for providing information and executing an associated digital action, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software technology associated with converting audio data into text data and extracting associated computer code for providing information and executing an associated digital action. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with converting audio data into text data and extracting associated computer code for providing information and executing an associated digital action. Thus, the present invention discloses a process for deploying, creating, integrating, hosting, maintaining, and/or integrating computing infrastructure, including integrating computer-readable ode into the computer system 90, wherein the code in combination with the computer system 90 is capable of performing a method for enabling a process for improving software technology associated with converting audio data into text data and extracting associated computer code for providing information and executing an associated digital action. In another embodiment, the invention provides a business method that performs the process steps of the invention on a subscription, advertising, and/or fee basis. That is, a service supplier, such as a Solution Integrator, could offer to enable a process for improving software technology associated with converting audio data into text data and extracting associated computer code for providing information and executing an associated digital action. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a configuration of hardware and software, any configuration of hardware and software, as would be known to a person of ordinary skill in the art, may be utilized for the purposes stated supra in conjunction with the computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
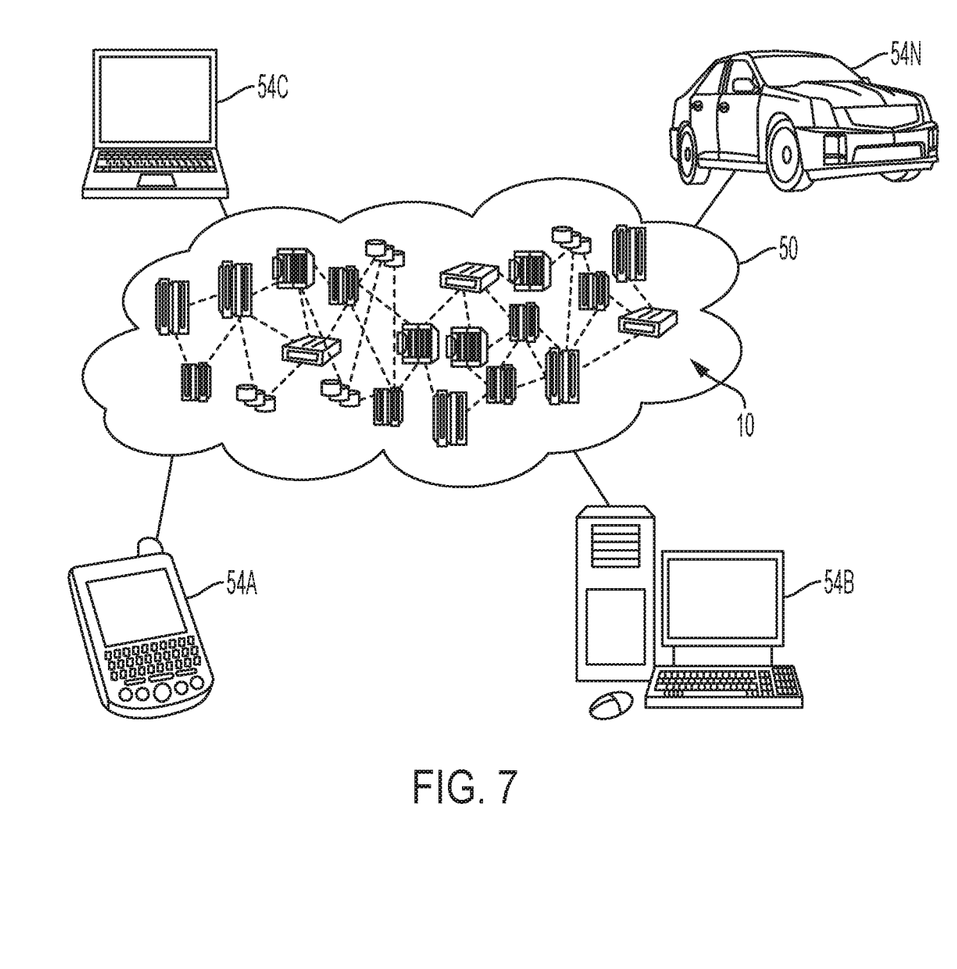
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
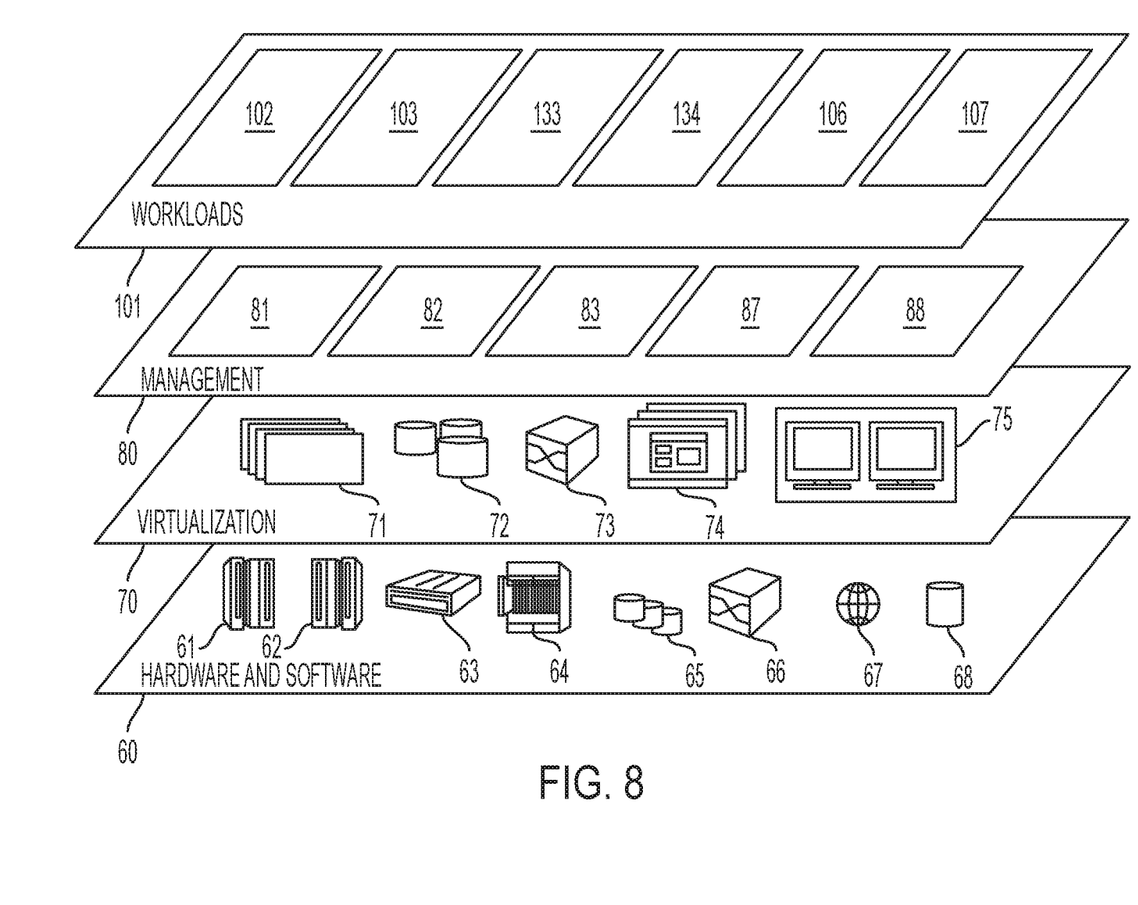
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software technology associated with converting audio data into text data and extracting associated computer code for providing information and executing an associated digital action 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An interactive software selection and modification method comprising:
   retrieving, by a processor of a hardware device via a sensor of said hardware device, audio data retrieved during a conference call with a subject matter expert (SME);
   converting, by said processor, said audio data into a text data training set;
   converting, by said processor, informal documents of said SME into a document training set;
   analyzing, by said processor, canonical documents generated by a plurality of alternative authors;
   extracting, by said processor from said text data training set and said document training set, specified data and associated code;
   retrieving, by said processor, additional text data converted from audio data of a plurality of individuals;
   detecting, by said processor via a plurality of sensors, attributes of said plurality of individuals with respect to said additional text data;
   comparing, by said processor, said attributes with specified data and said canonical documents;
   first determining, by said processor, that said plurality of individuals are requesting information associated with said text data;
   providing, by said processor based on results of said first determining, said information to said plurality of individuals via said canonical documents or said informal documents of said SME and transcripts of conference calls of the SME;
   determining, by said processor based on results of said comparing, if a matched set of data exists between said attributes and said specified data and said canonical documents; and
   executing, by said processor, a digital action associated with results of said determining.

2. The method of claim 1, wherein said results of said determining indicate that a matched set of data exists between said attributes and said specified data and said canonical documents, and wherein said executing said digital action comprises:
   presenting specified data of said text data training set or said document training set.

3. The method of claim 1, wherein said results of said determining indicate that a matched set of data does not exist between said attributes and said specified data and said canonical documents, and wherein said executing said digital action comprises:
   presenting a dataset of said text data training set or said document training set.

4. The method of claim 1, wherein said results of said determining indicate that a matched set of data does not exist between said attributes and said specified data and said canonical documents, and wherein said executing said digital action comprises:
   presenting a dataset of said canonical documents.

5. The method of claim 1, wherein said results of said determining indicate that a matched set of data does not exist between said attributes and said specified data and said canonical documents, and wherein said executing said digital action comprises:
   indicating a conflict between said specified data and said canonical documents;
   presenting a dataset of said canonical documents and said specified data.

6. The method of claim 1, further comprising:
   receiving, by said processor from a user, feedback associated with said action.

7. The method of claim 1, further comprising:
   generating, by said processor, a digital report and associated computer code associated with said executing said action.

8. The method of claim 1, further comprising:
   integrating, by said processor, said action with a GUI with respect to virtual functionality.

9. The method of claim 1, further comprising:
converting, by said processor, results of said executing said action into a second language differing from a language of said specified data and said canonical documents.

10. The method of claim 1, further comprising:
modifying, by said processor based on said specified data and said canonical documents, software code for executing future processes associated with said interactive software selection and modification method.

11. The method of claim 1, further comprising:
providing at least one support service for at least one of creating, integrating, hosting, maintaining, and deploying computer-readable code in the control hardware, said code being executed by the computer processor to implement: said retrieving, said converting said audio data, said converting said informal documents, said analyzing, said extracting, said detecting, said comparing, said first determining, said providing, said determining, said executing.

12. A computer program product, comprising a computer readable hardware storage device storing a computer readable program code, said computer readable program code comprising an algorithm that when executed by a processor of hardware device implements an interactive software selection and modification method, said method comprising:
retrieving, by said processor via a sensor of said hardware device, audio data retrieved during a conference call with a subject matter expert (SME);
converting, by said processor, said audio data into a text data training set;
converting, by said processor, informal documents of said SME into a document training set;
analyzing, by said processor, canonical documents generated by a plurality of alternative authors;
extracting, by said processor from said text data training set and said document training set, specified data and associated code;
retrieving, by said processor, additional text data converted from audio data of a plurality of individuals;
detecting, by said processor via a plurality of sensors, attributes of said plurality of individuals with respect to said additional text data;
comparing, by said processor, said attributes with specified data and said canonical documents;
first determining, by said processor, that said plurality of individuals are requesting information associated with said text data;
providing, by said processor based on results of said first determining, said information to said plurality of individuals via said canonical documents or said informal documents of said SME and transcripts of conference calls of the SME;
determining, by said processor based on results of said comparing, if a matched set of data exists between said attributes and said specified data and said canonical documents; and
executing, by said processor, a digital action associated with results of said determining.

13. The computer program product of claim 12, wherein said results of said determining indicate that a matched set of data exists between said attributes and said specified data and said canonical documents, and wherein said executing said digital action comprises:
presenting specified data of said text data training set or said document training set.

14. The computer program product of claim 12, wherein said results of said determining indicate that a matched set of data does not exist between said attributes and said specified data and said canonical documents, and wherein said executing said digital action comprises:
presenting a dataset of said text data training set or said document training set.

15. The computer program product of claim 12, wherein said results of said determining indicate that a matched set of data does not exist between said attributes and said specified data and said canonical documents, and wherein said executing said digital action comprises:
presenting a dataset of said canonical documents.

16. The computer program product of claim 12, wherein said results of said determining indicate that a matched set of data does not exist between said attributes and said specified data and said canonical documents, and wherein said executing said digital action comprises:
indicating a conflict between said specified data and said canonical documents;
presenting a dataset of said canonical documents and said specified data.

17. The computer program product of claim 12, wherein said method further comprises:
receiving, by said processor from a user, feedback associated with said action.

18. The computer program product of claim 12, wherein said method further comprises:
generating, by said processor, a digital report and associated computer code associated with said executing said action.

19. The computer program product of claim 12, wherein said method further comprises:
integrating, by said processor, said action with an interface with respect to virtual functionality.

20. A hardware device comprising a processor coupled to a computer-readable memory unit, said memory unit comprising instructions that when executed by the processor implements an interactive software selection and modification method comprising:
retrieving, by said processor via a sensor of said hardware device, audio data retrieved during a conference call with a subject matter expert (SME);
converting, by said processor, said audio data into a text data training set;
converting, by said processor, informal documents of said SME into a document training set;
analyzing, by said processor, canonical documents generated by a plurality of alternative authors;
extracting, by said processor from said text data training set and said document training set, specified data and associated code;
retrieving, by said processor, additional text data converted from audio data of a plurality of individuals;
detecting, by said processor via a plurality of sensors, attributes of said plurality of individuals with respect to said additional text data;
comparing, by said processor, said attributes with specified data and said canonical documents;
first determining, by said processor, that said plurality of individuals are requesting information associated with said text data;
providing, by said processor based on results of said first determining, said information to said plurality of individuals via said canonical documents or said informal documents of said SME and transcripts of conference calls of the SME;

determining, by said processor based on results of said comparing, if a matched set of data exists between said attributes and said specified data and said canonical documents; and executing, by said processor, a digital action associated with results of said determining.

* * * * *